United States Patent Office 3,770,771
Patented Nov. 6, 1973

3,770,771
N-INDOLYLETHYL SUBSTITUTED AMIDES OF 1-AMINOCYCLOPENTANECARBOXYLIC ACID
Harvey E. Alburn, Chester, and Norman H. Grant, Delaware, Pa., assignors to American Home Products Corporation, New York, N.Y.
No Drawing. Filed Nov. 11, 1971, Ser. No. 197,971
Int. Cl. C07d 27/56
U.S. Cl. 260—326.14 R         10 Claims

ABSTRACT OF THE DISCLOSURE

The compounds are amides of 1-aminocyclopentanecarboxylic acid, having valuable pharmacodynamic properties in that they have anti-inflammatory activity in warm-blooded animals.

DESCRIPTION OF THE INVENTION

This invention relates generally to novel chemical compounds having valuable pharmacodynamic properties and to processes for preparing said compounds. The novel compounds of the invention are the amides of 1-aminocyclopentanecarboxylic acid encompassed within the following general formula:

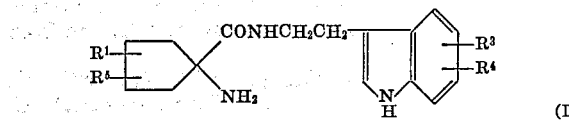

wherein $R^1$, $R^2$, $R^3$ and $R^4$ are each selected from the group consisting of hydrogen, lower alkyl, lower alkoxy, hydroxy, halogen and nitro, and each of $R^3$ and $R^4$ may additionally be amino.

The novel compounds of Formula I may conveniently be prepared by heat-reacting a selected N-carboxyanhydride of 1-aminocyclopentanecarboxylic acid with an indolylethyl-substituted primary amine in accordance with the following reaction scheme:

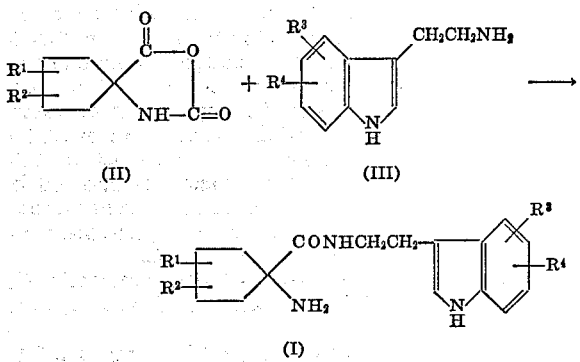

wherein $R^1$–$R^4$ have the same meaning described hereinbefore.

The reactants (III), the suitable derivatives of tryptamine, employed in the preparative process illustrated by the above reaction scheme may readily be prepared by the known synthesis for adding the desired substituents in the ring of tryptamine per se. The reactants (II), the N-carboxyanhydrides of 1-aminocyclopentanecarboxylic acid, which are not commercially available, can easily be prepared in accordance with standard organic procedures well known to those skilled in the art. For example, a procedure which has been employed to synthesize the anhydrides of Formula II above utilized in the preparation of compound (I) of the present invention, is described in U.S. Pat. No. 3,206,455, "Process for Producing 6-(α-Aminoacylamino) Penicillanic Acids," H. E. Alburn and N. H. Grant.

It has been discovered that compounds of Formula I meeting the described qualifications have valuable pharmacological properties. More specifically, said compounds have been found to have unexpected anti-inflammatory activity, as referred to in greater detail hereinafter.

An inflammation is an abnormal condition of the tissues of some part of the body in which there is swelling, redness, heat and pain. It involves the process by which the body attempts to rid itself of bacteria, poisons, or other foreign substances which irritate or injure the tissues. The blood vessels in the affected part expand, causing more blood to flow into the irritated or injured area. The increased amount of blood in the affected part causes the redness, and the expanded blood vessels cause swelling. The accumulation of blood cells and expanded blood vessels press on sensory nerves to cause the pain that may accompany an inflammation. In those instances where the presence of bacteria is involved, white blood corpuscles pass through the blood vessels into the injured or invaded area to destroy many bacteria in situ. (The accumulation of bacteria and white corpuscles occurring in an inflammation is the matter termed "pus.")

It is well known that agents which are effective against inflammations are active also in preventing both the clinical and histopathologic changes which occur in experimentally induced granuloma in test animals. Such agents include the compounds prednisolone and phenylbutazone, each of which has been shown to be active against inflammations in test animals. Thus, experimentally induced inflammations in test animals may serve as a test standard for anti-inflammatory activity in general.

The experimentally induced inflammation found to be valuable for comparing the anti-inflammatory activity of a compound to be tested, with that of the aforesaid standard compound, may be caused by the insertion of cotton pellets into bilaterally adrenalectomized test animals in accordance with the procedure described by C. A. Winter et al. in Federation Proceedings, March–April 1963, vol. 22, No. 2, part I.

Test method

Pursuant to the test procedure of C. A. Winter et al. referred to above, male Wistar rats, weighing 150± grams are bilaterally adrenalectomized. The adrenalectomized rats are anesthetized and two cotton pellets are inserted subcutaneously in each animal. The cotton pellets are preferably Johnson and Johnson Dental Rolls (1), having weight ranges of 38±1; 40±1; 41±1; 42±1; 43±1; and 44±1 mg. The animals are then provided with 1% saline solution containing 0.01% glucose, and a standard stock diet, and the room temperature maintained at 78°–80° F. Beginning on the same day of the insertion of the cotton pellets, treatment is instituted by oral administration of 1.5 and 3.0 mg. of selected test compounds in aqueous solution of carboxymethyl cellulose (0.5%) with respect to half the rats. The treatment is administered twice daily for five consecutive days for a total of ten doses.

All the rats (both those treated and the control group) are autopsied on the seventh day and the granulomas (cotton pellets) are removed. The pellets are dried for 72 hours at 80° C. and then maintained for 24 hours at room temperature. The pellets are then weighed individually to the nearest 0.1 mg.

The anti-inflammatory activity of the test compounds may then be expressed as percent inhibition, which is determined with the use of the following formula:

Percent inhibition = 100
$$\times \frac{(\text{Av. pellet wt. increase for control minus av. pellet wt. increase for treated})}{(\text{Av. pellet wt. increase for control})}$$

The statistical significance and percent relative potency of the test compound is then compared with that of the reference standard used.

In the exercising of the method of the invention, the compounds of Formula I used therein may be administered alone or in combination with pharmaceutically acceptable carriers, and the proportion of which is determined by the solubility and chemical nature of the compound selected, the chosen route of administration, and standard pharmaceutical practice. For example, they may be administered orally in the form of tablets or capsules, which may contain conventional excipients, or in the form of solutions; or they may be injected parenterally, that is, intramuscularly, intravenously or subcutaneously. For parenteral administration, they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

The compounds (I) of the present invention, when tested in accordance with the test procedure given in detail hereinbefore, show a percent inhibition of inflammation of the order of from about 20 to 30%.

The following examples are illustrative of the preparation of the compounds useful in the method of the invention and of the exercising of the latter, but are not to be considered necessarily limitative thereof:

EXAMPLE I 1-amino-N-[2-(1H-indol-3-yl)ethyl] cyclopentanecarboxamide

Three grams of tryptamine hydrochloride was dissolved in 40 ml. of water, and 7.6 ml. of 2 N NaOH was added. Tryptamine base separated and was dissolved in 100 ml. of ethylacetate. To this solution was added 1.97 g. of N-carboxy-1-aminocyclopentanecarboxylic acid, and the mixture was refluxed for 2 hours. It was then cooled, whereupon a precipitate formed. This was separated and combined with a crop formed subsequently from concentrating the mother liquor.

Calcd. for $C_{16}H_{21}N_3O$ (percent): C, 70.8; H, 7.7; N, 15.5. Found (percent): C, 70.6; H, 8.0; N, 15.4.

The product possesses anti-inflammatory activity, as shown in the test described hereinbefore.

EXAMPLE II

Following the procedure of Example I, a series of N-carboxyanhydrides of 1-aminocyclopentane carboxylic acids (II) are reacted with selected indolylethyl substituted primary amines (III) to prepare the amides of 1-aminocyclopentane carboxylic acids (I), which have anti-inflammatory activity in warm-blooded animals, as demonstrated by the standard pharmacological procedure described hereinbefore. The reactants (II) and (III) and resulting compounds (I) of the invention having said activity are set forth in Table A below:

TABLE A

| N-carboxy anhydride of 1-aminocyclopentane carboxylic acid (II) | Indolylethyl amines (III) | Resulting amide (I) |
|---|---|---|
| N-carboxy-2-methyl-1-aminocyclopentanecarboxylic acid. | 4-chlorotryptamine | 2-methyl-1-amino-N-[2-(1H-4-chloro-indol-3-yl)ethyl]cyclopentanecarboxamide. |
| N-carboxy-2-ethyl-3-propyl-1-aminocyclopentanecarboxylic acid. | 5,6-dimethyltryptamine | 2-ethyl-3-propyl-1-amino-N-[2-(1H-5,6-dimethyl-indol-3-yl)-ethyl]cyclopentanecarboxamide. |
| N-carboxy-2-ethoxy-1-aminocyclopentanecarboxylic acid. | 7-methoxytryptamine | 2-ethoxy-1-amino-N-[2-(1H-7-methoxy-indol-3-yl)ethyl]cyclopentanecarboxamide. |
| N-carboxy-3-hydroxy-1-aminocyclopentanecarboxylic acid. | 6-nitrotryptamine | 3-hydroxy-1-amino-N-[2-(1H 5,6-nitro-indol-3-yl)ethyl]cyclopentanecarboxamide. |
| N-carboxy-2-bromo-1-aminocyclopentanecarboxylic acid. | 5-aminotryptamine | 2-bromo-1-amino-N-[2-(5-amino-1H-indol-3-yl)ethyl]cyclopentanecarboxamide. |
| N-carboxy-3-nitro-1-aminocyclopentanecarboxylic acid. | 4-hydroxytryptamine | 3-nitro-1-amino-N-[2-(4-hydroxy-1H-indol-3-yl)ethyl]-cyclopentanecarboxamide. |
| N-carboxy-2-methoxy-3-fluoro-1-aminocyclopentanecarboxylic acid. | 4-propyl-6-aminotryptamine | 2-methoxy-3-fluoro-1-amino-N-[2-(4-propyl-6-amino-1H-indol-3-yl)ethyl]cyclopentanecarboxamide. |
| N-carboxy-2-chloro-3-propoxy-1-aminocyclopentanecarboxylic acid. | 5-propoxytryptamine | 2-chloro-3-propoxy-1-N-[2-(5-propoxy-1H-indol-3-yl)ethyl]cyclopentanecarboxamide. |

We claim:

1. An amide of 1 - aminocyclopentanecarboxylic acid selected from those having the formula:

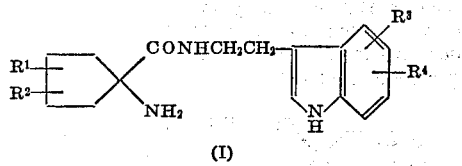

(I)

wherein $R^1$, $R^2$, $R^3$ and $R^4$ are each selected from the group consisting of hydrogen, lower alkyl having from 1 to 3 carbon atoms, lower alkoxy having from 1 to 3 carbon atoms, hydroxy, halogen and nitro, and each of $R^3$ and $R^4$ may additionally be amino.

2. A compound as defined in claim 1, which is: 1-amino - [2 - (1H - indole-3-yl)ethyl]cyclopentanecarboxamide.

3. A compound as defined in claim 1, which is: 2-methyl-1-amino-N-[2-(1H-4-chloro -indol - 3 - yl)ethyl]cyclopentanecarboxamide.

4. A compound as defined in claim 1, which is: 2-ethyl-3-propyl - 1 - amino-N-[2-(1H-5,6-dimethyl-indol-3-yl)ethyl]cyclopentanecarboxamide.

5. A compound as defined in claim 1, which is: 2-ethoxy - 1 - amino-N-[2-(1H-7-methoxy-indole-3-yl)ethyl] cyclopentanecarboxamide.

6. A compound as defined in claim 1, which is: 3-hydroxy - 1 - amino-N-[2-(1H-6-nitro-indol-3-yl)ethyl]cyclopentanecarboxamide.

7. A compound as defined in claim 1, which is: 2-bromo - 1 - amino-N-[2-(5-amino-1H-indol-3-yl)ethyl]cyclopentanecarboxamide.

8. A compound as defined in claim 1, which is: 3-nitro - 1 - amino-N-[2-(4-hydroxy-1H-indol-3-yl)ethyl] cyclopentanecarboxamide.

9. A compound as defined in claim 1, which is: 2-methoxy - 3 - fluoro-1-amino-N-[2-(4-propyl-6-amino-1H-dol-3-yl)ethyl]cyclopentanecarboxamide.

10. A compound as defined in claim 1, which is: 2-chloro - 3 - propoxy-1-N-[2-(5-propoxy - 1H - indol-3-yl)ethyl]cyclopentanecarboxamide.

References Cited
UNITED STATES PATENTS
3,472,870  10/1969  Larsen et al. ---- 260—326.12

JOSEPH A. NARCAVAGE, Primary Examiner

U.S. Cl. X.R.

260—307 B; 424—274

UNITED STATES PATENT OFFICE
CERTIFICATE OF CORRECTION

Patent No. 3,770,771  Dated January 23, 1974

Inventor(s) Harvey E. Alburn and Norman H. Grant

It is certified that error appears in the above-identified patent and that said Letters Patent are hereby corrected as shown below:

Column 2, lines 67-70, in the equation, the numeral "100", which presently appears immediately following equals ("=") sign in line 67 should instead appear immediately in front of the multiplication ("X") sign in line 70; column 4, claim 2, line 2, which presently appears as "amino-[2-(1H-indole-3-yl)ethyl..." should read --amino-N-[2-(1H-indole-3-yl)-ethyl...; again in column 4, claim 5, line 2, "indole" should read -- indol--

Signed and sealed this 22nd day of October 1974.

(SEAL)
Attest:

McCOY M. GIBSON JR.
Attesting Officer

C. MARSHALL DANN
Commissioner of Patents